(No Model.)
B. ROBER.
CIRCULATING PIPE FOR THE TRANSMISSION OF HEAT.
No. 308,197. Patented Nov. 18, 1884.
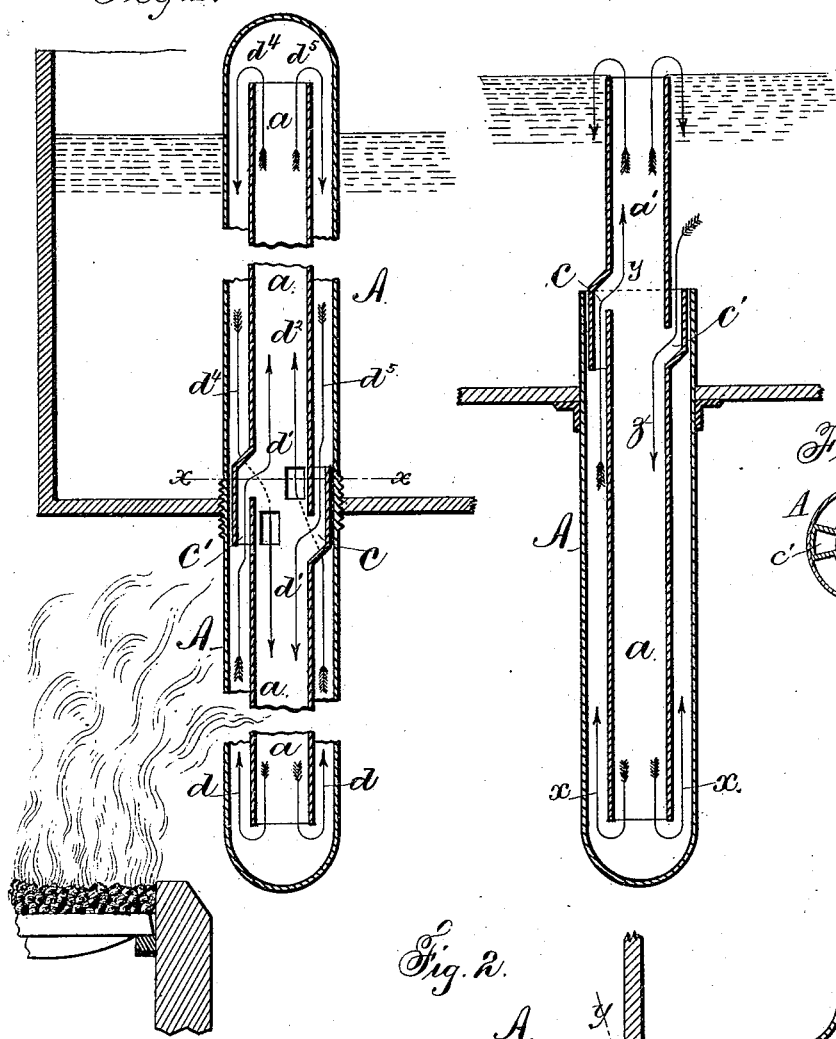

UNITED STATES PATENT OFFICE.

BERNHARD RÖBER, OF DRESDEN, SAXONY, GERMANY.

CIRCULATING-PIPE FOR THE TRANSMISSION OF HEAT.

SPECIFICATION forming part of Letters Patent No. 308,197, dated November 18, 1884.

Application filed November 22, 1880. (No model.) Patented in Germany August 19, 1880, No. 14,552, and May 31, 1881, No. 20,839; in France October 29, 1880, No. 139,395; in England November 4, 1880, No. 4,516; in Belgium November 6, 1880, No. 52,961; in Austria-Hungary December 21, 1880, No. 34,373 and No. 39,721, and August 14, 1881, No. 18,052 and No. 29,199, and in Italy December 31, 1880, XXIV, 423, and July 16, 1881, XXVI, 196.

*To all whom it may concern:*

Be it known that I, BERNHARD RÖBER, of Dresden, in the Kingdom of Saxony, German Empire, have invented an Improvement in Transmitting Heat, of which the following is a specification.

This invention relates to the transmission of heat in closed transmitting-pipes. I remove all noxious influences of direct fire on the surface of steam-boilers, heating-boilers, or evaporating apparatus, by the arrangement of heat-transmitting pipes, in which are previously inserted or inclosed one or more bodies which will adopt, take up, or absorb, the heat of the fire and transmit such heat to the body or medium to be heated without coming in direct contact with the latter. By these means I am enabled to avoid all direct fire-surface of said boilers or apparatus. The pipes for transmitting heat may be filled with a matter or material having the same or a lower boiling-point than the fluid to be heated—for instance, with water. The pipe may be filled under atmospheric pressure, or at higher or lower pressure according to the result I wish to attain. The pipes for transmitting heat may be filled with chemical compounds, decomposing in the heat and re-entering into compounds at the cooler end of the pipes and then flowing back to the warmer part of the pipes in order to be decomposed afresh and to absorb heat during decomposition, so as to deliver the heat in combining at the cooler part of the pipes. One of these chemical matters, for instance, is carbonate of ammonia. The pipes for transmitting heat may be filled with such matter or material which may be brought into the critical state or condition in the warmer part of the pipe, (as, for instance, carbonic-acid, ether, &c.,) and which matter or material returns to its usual state at the cooler part of the pipe after giving up or delivering its heat. The pipes for transmitting heat may be filled with matters or materials having a higher point of boiling than the fluid to be heated, and which matters or materials will, by circulation only or in connection with development of steam, accumulate heat and deliver this heat to the fluid to be heated. These matters or materials may be, for instance, solution of salts or alloy of metals, paraffine, &c. It is desirable to have a circulation of greatest speed within these pipes for transmission of heat, and this rapid circulation is obtained by arranging special circulation-pipes within the pipes for the transmission of heat.

In the drawings, Figure 1 shows a vertical pipe for the transmission of heat, provided with a special circulation-tube within. Fig. 2 is a horizontal pipe for the transmission of heat, provided with a special circulation-tube and arrangement within. Fig. 3 is a vertical pipe for transmitting heat, open at the top end and provided with a special circulation-tube. Fig. 4 is a cross-section of the circulation-tubes at the line $xx$, Fig. 1; and Fig. 5 is a cross-section of the circulation-tubes at the line $yy$, Fig. 2.

In case the pipe for transmitting heat is situated inclined, the construction of both the transmitting-pipe and circulating-tube will undergo certain modifications. After filling the pipes with the desired liquids or solutions, I close any holes or openings by soldering.

I intend, by the constructions shown in Figs. 1 and 3, to transmit the heat at the greatest distance from the fire—as, for instance, in a steam-boiler at the level of the water—and to heat the water to the utmost at the exit of the steam. I for this purpose insert or introduce into the pipe A the circulation-tube $a$, which latter, in the vicinity of the wall through which the pipe A passes, is provided with certain holes, channels, apertures, or openings C C', as shown in Figs. 1 and 3. The hot upright stream or flow is indicated by the arrows $d\ d$, flowing upward in the annular-shaped space between the circulation-tube and the transmission-pipe, collecting or absorbing, on its way upward, the heat. This stream or flow enters through the openings or the channels C C' into the interior of the upper part of the circulation-tube $a$, as indicated by the arrows $d'\ d^2$, going in an upward direction without parting materially with its heat. From the top it returns, with its highest temperature, in the direction of the arrows $d^4$ $d^5$, descending near the surface of the pipe A. Here the stream or flow delivers the greater part of its heat, the greatest delivery of heat taking place at the upper part of the pipe and at the greatest distance from the fire. The descending stream enters through channel or opening C′ into the interior of the circulating-tube, in order to recommence at $d$ its circulation, as described.

Fig. 2 shows the arrangement in which one part of the circulation-tube is replaced by the plate $p$, dividing the pipe for transmission of heat into two semicircles. At the other end the circulation-tube $a$ is prolonged, as shown in Fig. 2, and the arrows show clearly the circulation of the fluid or liquid.

I propose to arrange with my pipes for the transmission of heat such apparatus as will stand the heat of a direct fire, and for this purpose I cover that part of the pipe for transmitting the heat which enters into the fluid or gases to be heated with enamel or any other well-known protecting material, whereas that part of the pipe for transmitting the heat which is in direct contact with the fire is left entirely free from such cover. The heated fluids will not injure the enamel.

The pipes for transmitting the heat may be of any desired shape in cross-section.

In cases in which the flow or stream of heated fluid in the annular part of the pipe for transmitting the heat exposed to the fire shall mingle with the fluid or liquor to be heated, I use the circulation-tube shown in Fig. 3, by which the highest temperature is transmitted to the point of greatest distance from the fire. The heat-transmitting-pipe A is open at the top end, such pipes having been used before. I provide this pipe with a circulation-tube, $a$, having a prolongation, $a'$, extending upward to the normal level of water in the boiler or fluid in any vessel. The stream or flow going in an upward direction, as indicated by the arrows $x$ $x$, will enter through suitable holes or openings, C C′, into the interior of the prolonged tube $a'$, as indicated by arrow $y$, whereas the downward stream enters into the interior of the circulation-tube, as indicated by the arrow $z$.

I am aware that a vertical drop-tube, closed at the bottom and open at the top, has been passed through the lower side of the boiler, and within the same there has been a smaller vertical tube open at the bottom and passing out laterally through the side of the drop-tube within the boiler. The circulation in this case does not correspond with that in my apparatus.

I claim as my invention—

1. In an apparatus for transmitting heat, a cylinder containing the heat-transmitting liquid, one end of which cylinder is within a fire-chamber or other source of heat and the other end in the material to be heated, in combination with a tube within said cylinder provided with passage-ways for passing the descending current through the lower part of such inner tube and the ascending current through the upper part of such inner tube, substantially as and for the purposes specified.

2. The closed cylinder A A, containing the heat-transmitting liquid, in combination with the open-ended tube $a$ $a'$ within said cylinder, and passage-ways to cause the heat-transmitting liquid to circulate downwardly in the lower part of such inner tube and upwardly in the upper part of such inner tube, substantially as and for the purposes specified.

3. In an apparatus for transmitting heat, the combination of a cylinder containing the heat-transmitting liquid, a tube within said cylinder, open at both ends and provided with passage-ways and partitions so arranged that the heat-transmitting liquid in circulating rises as it becomes heated by the exterior cylinder and then ascends through the upper end of the inner tube and descends between the tube and cylinder, where it gives off its heat and returns by the inner tube to the opposite end of said cylinder to be reheated, substantially as and for the purposes specified.

4. In an apparatus for heating by convection, a tube or cylinder exposed at one part to the heat and at the other part to the material to be heated, a tube or partition within the same, and openings or passage-ways in such inner tube or partition to permit the rising of the fluid from the outer tube through the upper part of the inner tube, and arranged, substantially as specified, so that the circulating liquid ascends as it receives its heat and passes out at the upper end of the inner tube and descends as it parts with the heat, and then passes into the lower part of the cylinder, whereby rapid circulation is maintained, substantially as set forth.

In testimony whereof I have hereunto set my hand, this 22d day of October, 1880, in the presence of two subscribing witnesses.

BERNHARD RÖBER.

Witnesses:
 WILHELM WIESENHÜTTER,
 MARTIN KÖRNER.